United States Patent
Nguyen et al.

(10) Patent No.: US 7,106,846 B2
(45) Date of Patent: Sep. 12, 2006

(54) SYSTEM AND METHOD FOR CALLER CONTROL OF A DISTINCTIVE RING

(75) Inventors: Hong Thi Nguyen, Atlanta, GA (US); Linda Ann Roberts, Decatur, GA (US); Edward Michael Silver, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 483 days.

(21) Appl. No.: 10/135,668

(22) Filed: Apr. 30, 2002

(65) Prior Publication Data

US 2003/0202651 A1 Oct. 30, 2003

(51) Int. Cl.
 *H04M 3/42* (2006.01)

(52) U.S. Cl. ............. 379/207.16; 379/372; 379/373.01; 379/373.02

(58) Field of Classification Search ................. 379/207, 379/373.02
See application file for complete search history.

(56) References Cited

U.S. PATENT DOCUMENTS

| | | | | |
|---|---|---|---|---|
| 5,103,475 | A | * | 4/1992 | Shuen ................... 379/115.01 |
| 5,384,831 | A | | 1/1995 | Creswell et al. |
| 5,442,692 | A | * | 8/1995 | Yamazaki et al. .......... 379/253 |
| 5,544,229 | A | | 8/1996 | Creswell et al. |
| 5,828,742 | A | | 10/1998 | Khalid et al. |
| 5,995,603 | A | | 11/1999 | Anderson |
| 6,134,311 | A | | 10/2000 | Ekstrom |
| 6,252,953 | B1 | | 6/2001 | Gruchala et al. |
| 6,314,306 | B1 | | 11/2001 | Harris |
| 6,327,354 | B1 | | 12/2001 | Pelletier et al. |
| 6,332,021 | B1 | | 12/2001 | Latter et al. |
| 6,366,791 | B1 | | 4/2002 | Chin |
| 6,381,594 | B1 | | 4/2002 | Eichstaedt et al. |
| 6,418,330 | B1 | | 7/2002 | Lee |
| 6,650,746 | B1 | | 11/2003 | Groen et al. |
| 6,658,455 | B1 | | 12/2003 | Weinman, Jr. |
| 6,697,470 | B1 | | 2/2004 | McDonough |
| 6,707,908 | B1 | | 3/2004 | Nagasawa |
| 2002/0094076 | A1 | | 7/2002 | Chen |

OTHER PUBLICATIONS

U.S. Appl. No. 10/201,043, Silver (ref 02147).
U.S. Appl. No. 10/279,352, filed Oct. 24, 2002, Silver.
Softswitch Model Drives New Age of Customized Communication, A CommWorks Position Paper, www.softswitch.org/education/reference.asp, in existence at least as of Sep. 9, 2002.
International Softswitch Consortium Reference Architecture, Softswitch Consortium, v. 1.2., Jun. 2002.
ISC Reference Architecture –Functional Plans, Softswitch Consortium, v. 1.0, Jan. 2002.

* cited by examiner

*Primary Examiner*—Sinh Tran
*Assistant Examiner*—Walter F Briney, III
(74) *Attorney, Agent, or Firm*—Withers & Keys, LLC

(57) ABSTRACT

A system for a caller to control a distinctive ring for a telephone call includes a service switching point and a service control point. The service switching point is operable to receive a feature code and a called directory number, and to issue a query in response to receiving the feature code. The service control point is operable to receive the query and issue a response to the service switching point. The response includes a distinctive ring parameter. Upon receiving the response from the service control point, the service switching point processes the call so that the distinctive ring parameter causes a distinctive ring signal to be applied to a called telephone line associated with the called directory number.

17 Claims, 5 Drawing Sheets

SYSTEM AND METHOD FOR CALLER CONTROL OF A DISTINCTIVE RING

BACKGROUND

1. Field of the Invention

The invention relates to the field of switched telephony, and more particularly to a system and method for caller control of a distinctive ring.

2. Description of the Related Art

When placing a call to a called party, a caller may often desire to provide indicia of his or her identity to the called party, or attract the attention of the called party so that the called party is more likely to answer the telephone. A caller may do so by controlling the ring pattern of the called party's telephone. This is accomplished by the caller invoking a distinctive ring control feature. Present systems provide for a distinctive ring if the call originates from a particular calling directory number, or a distinctive ring if the called directory number belongs to a predetermined call group, or a plurality of distinctive rings corresponding to a plurality of directory numbers assigned to a single telephone line. These systems, however, do not provide for caller control of a distinctive ring for a directory number specified by the caller.

SUMMARY

According to the invention, a telephone network includes a service switching point and a service control point. The service switching point is operable to receive a feature code and a called directory number input by a calling party placing a call, and to issue a query in response to receiving the feature code. The service control point is in communication with the service switching point over a communication path, and is operable to receive the query and issue a response to the service switching point. The response includes a distinctive ring parameter. Upon receiving the response from the service control point, the service switching point processes the call so that the distinctive ring parameter causes a distinctive ring signal to be applied to a called telephone line associated with the called directory number.

Also according to the invention, a method of processing a call placed by a calling party to a called telephone line in a telephone network is provided. The telephone network includes a service switching point and a service control point in communication with the service switching point over a communication path. The method includes the steps of receiving at the service switching point a feature code and a called directory number. The called directory number is associated with the called telephone line. A query is sent from the service switching point to the service control point after receiving the feature code, and the service control point generates a response to the query. The response includes a distinctive ring parameter. The response is sent to the service switching point, which then processes the call after receiving the distinctive ring parameter in the response. A distinctive ring signal based on the distinctive ring parameter is applied to the called telephone line.

Also according to the invention, a system for caller control of a distinctive ring is provided. The system includes a service switching point serving a calling telephone line. The service switching point is operable to receive from the calling telephone line a feature code and a called directory number associated with the called telephone line. In response to receiving the feature code, the service switching point issues a query. A service control point in communication with the service switching point over a first communication path is operable to receive the query and issue a response that includes a distinctive ring parameter. Upon receiving the response, the service switching point processes the call so that upon connection of the call the distinctive ring parameter causes a distinctive ring signal to be applied to the called telephone line. The distinctive ring signal is applied to the called telephone line independent of services associated with the called telephone line.

Also according to the invention, another method for a caller to control a ring pattern signal applied to a called telephone line in a telephone network providing a plurality of services includes the steps of receiving a first code and a called directory number input by the caller and associating the called directory number with the called telephone line. A modified ring pattern signal is then applied to the called telephone line in response to the first code and independent of services associated with the called telephone line.

BRIEF DESCRIPTION OF THE DRAWINGS

FIG. 4 is a flow diagram illustrating another exemplary process for a caller to control a ring pattern signal, subject to an authorization code;

DETAILED DESCRIPTION

The system and method according to the invention provide a caller controlled distinctive ring. Upon placing a call to a called directory number in a telephone network, a caller accesses a distinctive ring control feature. Accessing the distinctive ring control causes a distinctive ring signal to be applied to a called telephone line associated with the called directory number. The distinctive ring signal in turn causes a terminating device connected to the telephone line, such as a telephone, to ring with a distinctive ring.

In an illustrative embodiment, the distinctive ring control feature is accessed by dialing a feature code associated with the distinctive ring control. The feature code is dialed with the called directory number when the caller places the call.

In another illustrative embodiment, the distinctive ring control causes a distinctive ring signal to be applied to the called telephone line independent of distinctive ring services associated with the called telephone line. Thus, the calling party determines whether a distinctive ring will announce the call. Furthermore, the distinctive ring signal can be applied to any telephone line connected to the telephone network.

In yet another illustrative embodiment, an authorization code is provided to the calling party so that the calling party can limit access to the distinctive ring control. Furthermore, the calling party is charged a fee each time the calling party uses the distinctive ring control feature, and the authorization code identifies the calling party. Thus, the calling party call can use the distinctive ring control feature from any telephone in the network, and the resulting fee is charged to the calling party's telephone service bill.

Figure 1:
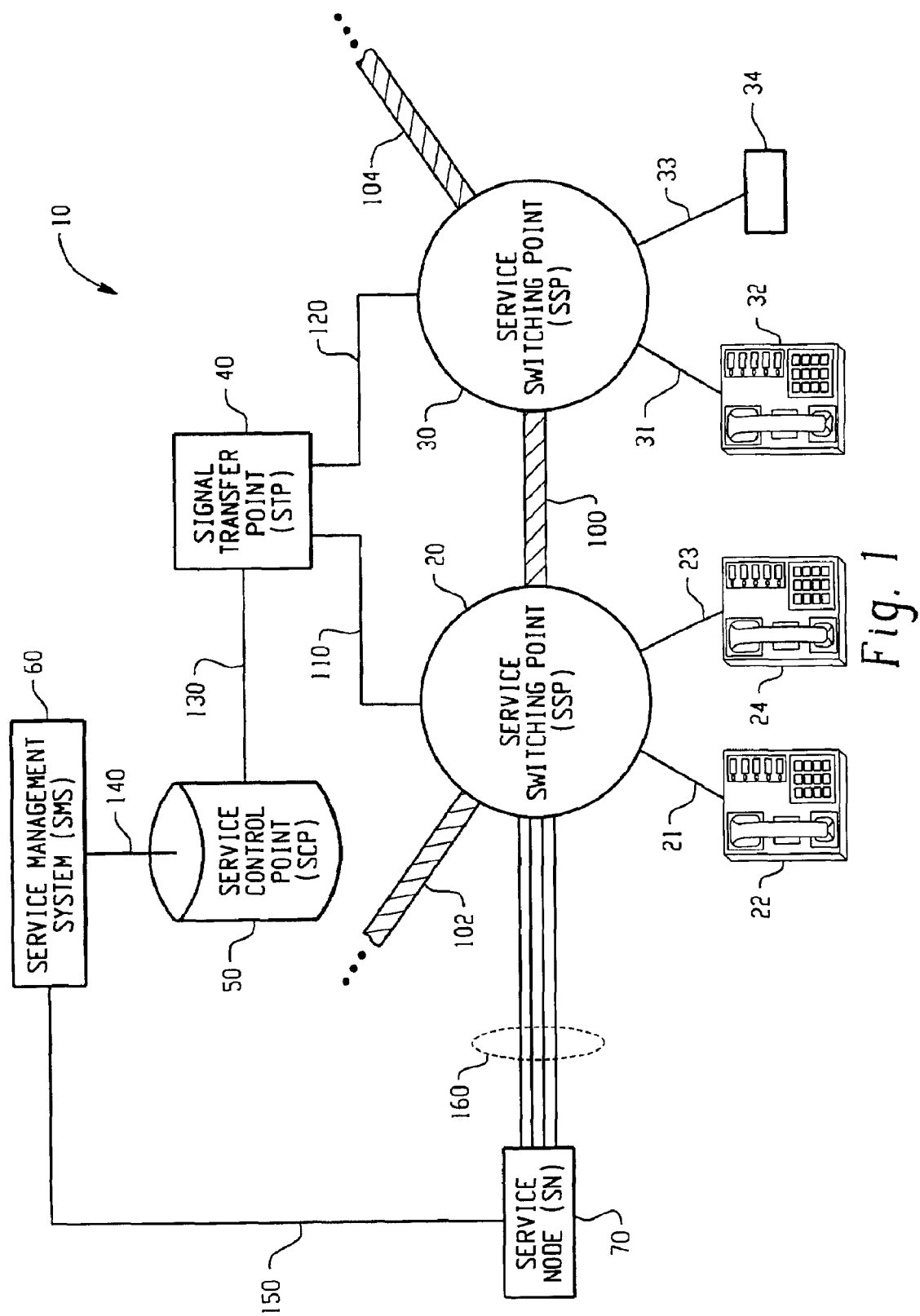
FIG. 1 is a block diagram of an exemplary Advanced Intelligent Network (AIN) environment.

Referring now to FIG. 1, the system 10 is illustratively implemented in an Advanced Intelligent Network (AIN). The architecture of the AIN is well known to those of ordinary skill in the art, and illustratively includes Service Switch Points (SSP) 20 and 30, a Signal Transfer Point (STP) 40, a Service Control Point (SCP) 50, a Service Management System (SMS) 60, and a Service Node (SN) 70. The SSP 20 and SSP 30 are connected by trunk circuits 100. Additionally, the SSP 20 is connected to another SSP (not shown) by trunk circuits 102, and the SSP 30 is connected to another SSP (not shown) by trunk circuits 104. The SSP 20 is further coupled to the STP 40 by a signaling link 110, and the SSP 30 is further coupled to the STP 40 by a signaling link 120. Similarly, the STP 40 is coupled to the SCP 50 by a signaling link 130; the SCP 50 is connected to the SMS 60 by a signaling link 140; and the SMS 60 is connected to the SN 70 by a signaling link 150. The SN 70 is also connected to the SSP 20 by an Integrated Service Digital Network (ISDN) 160.

The system 10 illustratively includes the SSP 20 and the SCP 50. The SSP 20 is operable to receive the feature code and the called directory number input by the calling party, and is further operable to issue a query in response to receiving the feature code. The SCP 50 is operable to receive the query and issue a response to the SSP 20. The response includes a distinctive ring parameter. Upon receiving the response from the SCP 50, the SSP 20 processes the call so that the distinctive ring parameter causes a distinctive ring signal to be applied to a called telephone line associated with the called directory number.

1. Exemplary Operating Environment

Referring again to FIG. 1, a more detailed description of the exemplary AIN environment is now provided. Communications in the AIN 10 network occur over the trunk circuits 100, 102 and 104, the signaling links 110, 120, 130 140 and 150, and over the ISDN 160. These communications are covered by the Signaling System 7 (SS7) communications protocol and the AIN communications protocol. These protocols are described in more detail in the documents entitled "Bell Communications Research Specification of Signaling System 7," Document TR-NWT-000246, Issue 2 (June 1991), plus Revision 1 (Dec. 1991), and Bellcore Specification GR-1298-CORE Switching Systems Generic Requirements for AIN, which are incorporated herein by reference.

The trunk circuits 100 are the voice path trunks, or voice channels, over which voice and data communications between a calling party and called party are established when calls are connected. The signaling links 110, 120, 130, 140 and 150 are bi-directional channels employing the SS7 protocol. Typically, the signaling links 110, 120, 130, 140 and 150 transmit SS7 messages at a 56 or 64 kilobit per second (kbps) rate. This is referred to as out-of-band signaling because the signaling does not take place over the voice channels in the trunk circuits 100, 102 and 104.

The SSP 20 serves a dedicated group of telephone lines. Telecommunication customers subscribe to one or more of these telephone lines. The telephone lines connect the SSP 20 to terminating devices, such as telephones or electronic communication devices. As illustrated, a telephone line 21 connects the SSP 20 to a telephone 22, and a telephone line 23 connects the SSP 20 to a telephone 24. Likewise, the SSP 30 also serves a dedicated group of telephone lines, including telephone line 31, which connects the SSP 30 to a telephone 32, and telephone line 33, which connects the SSP 30 to an electronic communication device 34. The electronic communication device 34 can be a facsimile machine, computer modem, or other electronic communication devices designed to transmit electronic communication device data over a voice channel.

Each of the telephone lines 21, 23, 31 and 33 is assigned a directory number. A directory number is a number that is dialed or input by an originating terminating device at a calling telephone line to reach a terminating device on a called telephone line associated with the directory number. Thus, a directory number is typically input into a telephone or electronic communication device to establish a voice channel to another telephone or electronic communication device attached to the network.

The SSPs 20 and 30 are connected to the STP 40 via the signaling links 110 and 120, respectively. The STP 40 is a multi-port high speed packet switch that routes each incoming message to an outgoing signaling link based on routing information contained in the SS7 message.

The STP 40 is connected to the SCP 50 via the signaling link 130. The SCP 50 contains programmable service-independent capabilities (or service logic) that are under control of the telephone service providers, and also contains subscriber databases that are used to provide advanced call-processing capabilities to a subscriber.

The SMS 60 is connected to the SCP 50 via the signaling link 140. The SMS 60 interfaces with the offices of the telephone service providers and provides a platform for remotely provisioning the SCP 50 to provide advanced call-processing capability to a subscriber. Thus, when a customer subscribes to certain AIN services, or modifies an ensemble of AIN services, the telephone service provider provides this information to the SCP 50 via the SMS 60.

The SN 70 includes voice and dual tone multi-frequency (DTMF) signal recognition devices and voice synthesis devices. The SN 70 is connected to the SMS 60 via the signaling link 150, and is also connected to the SSP 20 via the ISDN link 160. The SN 70 is typically employed in an AIN service to provide voice channel connection to a call or transfer data to a subscriber over a switched connection during or after a call.

Set-up, management and release of trunk circuits that carry voice channel data between an originating station and terminating station is governed by the ISDN User Part (ISUP) protocol known to those of ordinary skill in the art of telephone switching. A caller may place a call to a directory number served by the same SSP from which the call is placed, or may place a call to a directory number served by a different SSP from which the call is placed. Upon logical completion of the call, the system 10 rings the called line by providing a ring signal to the called telephone line associated with the called directory number, which, in turn, causes a terminating device connected to the called line to ring. Modifying the ring signal from a default normal ring signal results in a distinctive ring at the terminating device.

Call set-up differs between calls that originate and terminate at the same SSP and calls that originate and terminate at different SSPs. Calls that originate and terminate at the same SSP do not use ISUP signaling. For example, if a caller places a call from the telephone 22 to a directory number associated with the telephone line 23, ISUP signaling is not required. Thus, if the telephone 24 is not in use, the SSP 20 will connect the call to the telephone line 23.

However, if a caller places a call from the telephone 22 to a directory number associated with the telephone line 31, the call is placed to the SSP 30, which is an out-of-switch number. The SSP 20 transmits an ISUP Initial Address Message (IAM) to reserve an idle trunk circuit between the SSPs 20, 30. The IAM includes data related to the called party and calling party, and is routed via the STP 40. Upon receipt of the IAM, the SSP 30 examines the dialed directory number, determines that it serves the telephone line 31, and that the telephone line 31 is available for ringing. The SSP 30 then applies a ring pattern signal to the telephone line 31, and then transmits an Address Complete Message (ACM) to the SSP 20 via the STP 40. Upon receiving the ACM, the SSP 20 provides a ring signal heard by the calling party and connects the telephone line to the reserved trunk to complete the voice circuit from the calling party to the called party. If a voice channel is available over the trunk circuits 100, communication between the telephones 22 and 32 occurs over a voice channel located in the trunk circuits 100. If all of the trunk circuits 100 are allocated, however, a voice channel is established between the SSPs 20 and 30 through at least one other SSP (not shown) and the trunk circuits 102 and 104.

2. Exemplary Modes of Operation

Figure 2:
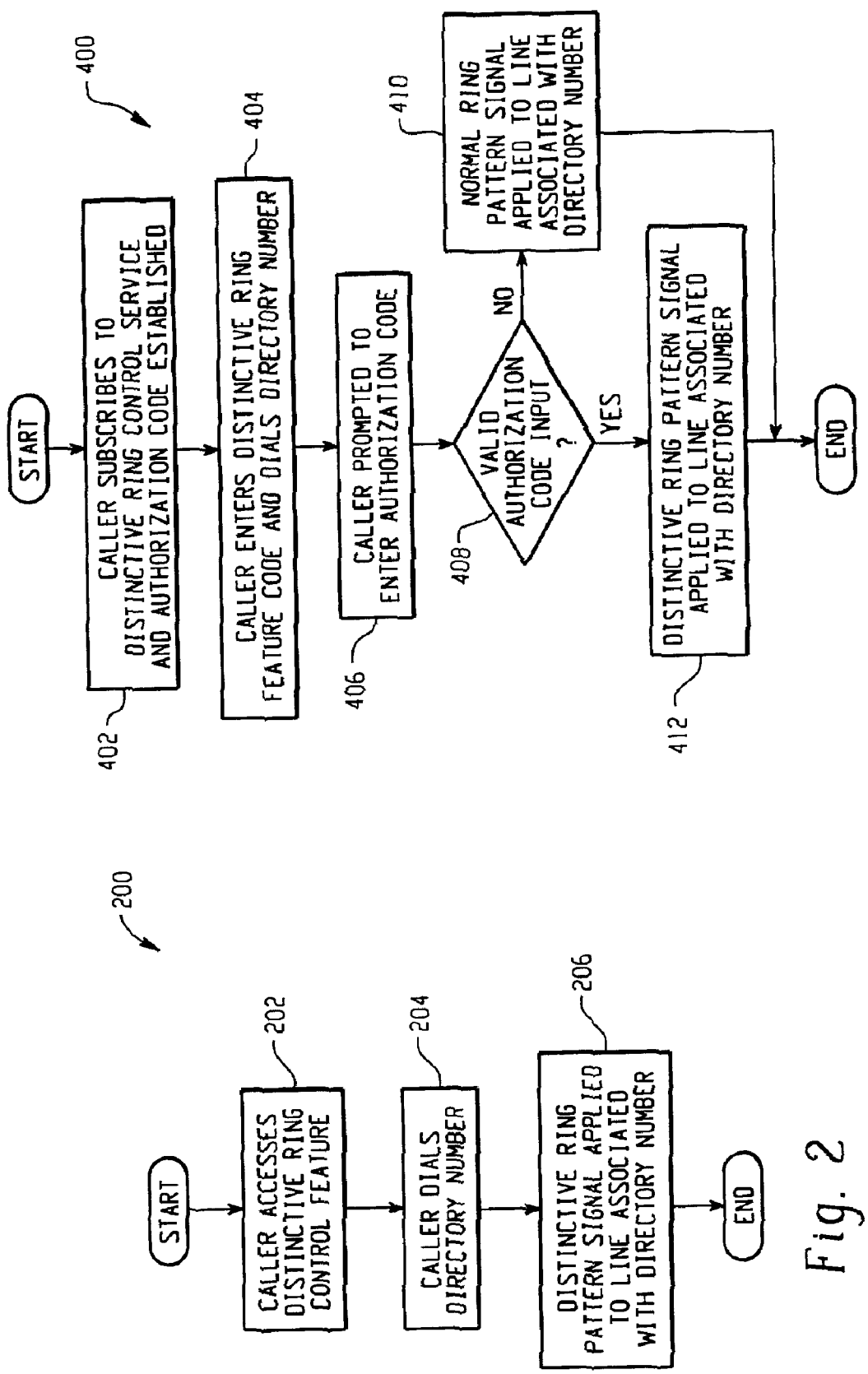
FIG. 2 is a flow diagram illustrating an exemplary process for a caller to control a ring pattern signal applied to a called telephone line.

FIG. 2 provides a flow diagram 200 illustrating an exemplary process for a caller to control a ring pattern signal applied to a called line. In step 202, a caller accesses a distinctive ring control feature. Accessing the distinctive ring control feature notifies the system 10 that a distinctive ring signal will be applied to the called telephone line. The called directory number need not be associated with a distinctive ring service, or any other telecommunications service, nor be associated with a calling group. Instead, the caller determines whether the distinctive ring signal will be applied to the called telephone line. Accordingly, the caller can control the ring pattern for any terminating device attached to the network independent of distinctive ring services provided to the called directory number associated with the terminating device.

Additionally, the distinctive ring control feature may be accessed from a directory number not associated with the caller; i.e. the caller need not place a call from a directory number associated with a distinctive ring service. Accordingly, the caller can control the ring pattern for any terminating device attached to the network from any terminating device attached to the network.

In step 204, the caller dials the directory number to place the call. In step 206, the call is completed, and a distinctive ring pattern signal is applied to a telephone line associated with the directory number. The terminating device connected to the telephone line will then ring with a distinctive ring.

Figure 3:
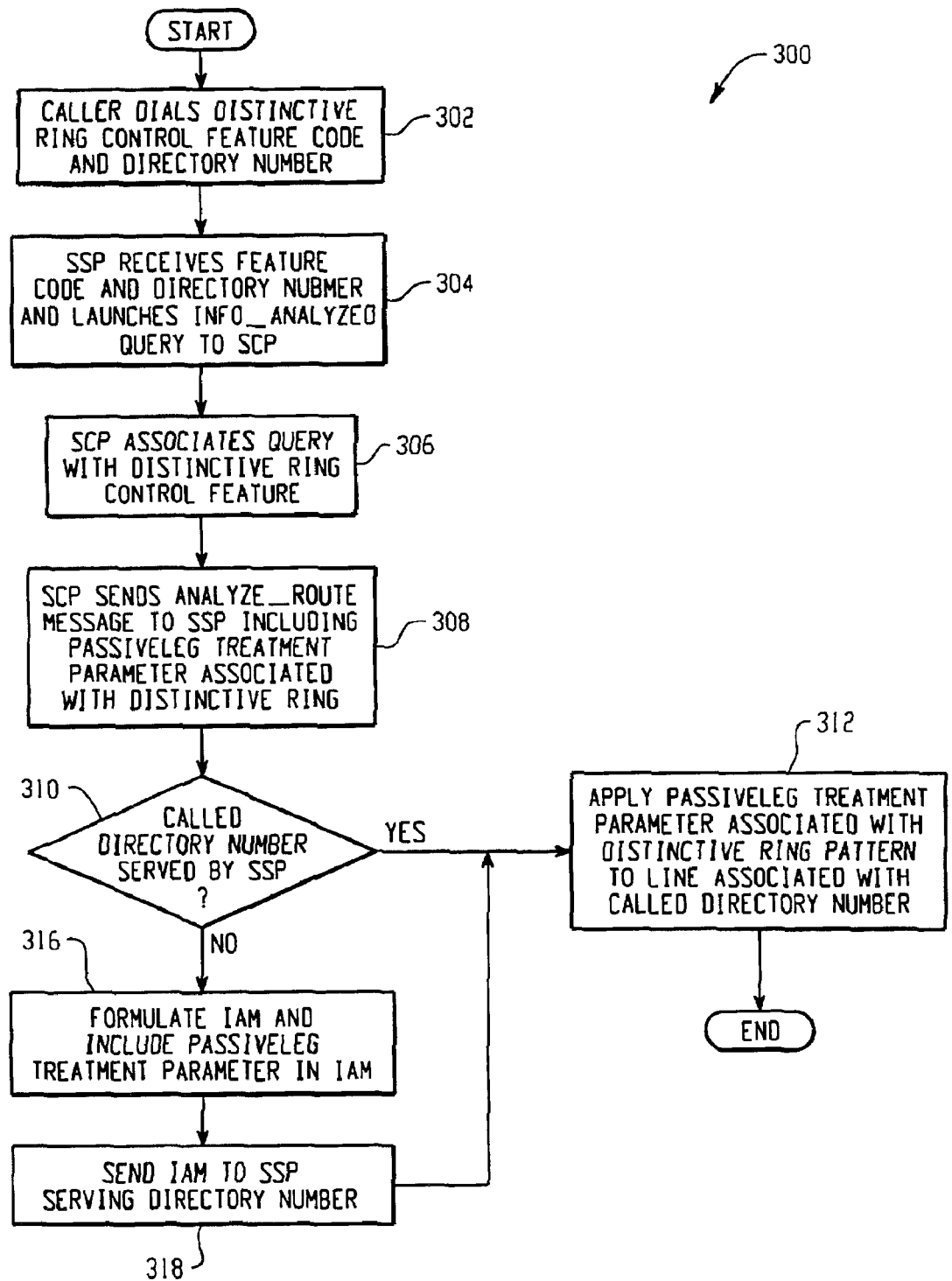
FIG. 3 is a flow diagram illustrating the exemplary process of FIG. 2 as implemented in an AIN environment.

FIG. 3 provides a flow diagram 300 illustrating the exemplary process of FIG. 2 as implemented in an AIN environment used by a telecommunications service provider. In step 302, the caller dials a distinctive ring control feature code and the directory number to place a call. A feature code is an indicator of a status of a communication. The feature code is a code entered by the caller at the caller's telephone, e.g. *77. The feature code is provisioned with a Feature Access Code (FAC) trigger by the telecommunications service provider.

In step 304, the SSP 20 receives the directory number dialed and the feature code. The FAC trigger will then be activated at the SSP 20, causing the SSP 20 to launch a query to the SCP 50. The query is an Info__Analyzed message sent from the SSP 20 to the SCP 50 over a signaling link in accordance with the SS7 signaling standards. The Info__Analyzed query includes data related to the dialed feature code, the calling directory number, and the called directory number.

In step 306, the SCP 50 receives the Info__Analyzed query from the SSP 20. Information related to the distinctive ring control is stored in the subscriber databases in the SCP 50. The SCP 50 associates the information to the dialed feature code contained in the Info__Analyzed query with the distinctive ring control. Accordingly, the SCP 50 provides an Analyze__Route response message back to the SSP 20 in step 308. The Analyze__Route response message is provided over a signaling link in accordance with the SS7 signaling standards. Data included in the Analyze__Route response include the called directory number and a PassiveLegTreatment parameter. The PassiveLegTreatment parameter includes a distinctive ring parameter. Processing the call with the distinctive ring parameter will cause the telephone line associated with the called directory number to ring with a distinctive ring.

Upon receiving the Analyze__Route response message from the SCP 50, the SSP 20 determines if it serves the called directory number, as shown in step 310. If the SSP 20 does serve the called directory number, the SSP 20 applies a distinctive ring signal to the telephone line associated with the directory number, as shown in step 312. The distinctive ring signal is based on the distinctive ring parameter received from the SCP 50.

However, if the SSP 20 does not serve the called directory number, the SSP 20 will set up the call to another SSP that does serve the called directory number through the ISUP protocol, as described above. The SSP 20 formulates an IAM to reserve an idle trunk circuit, as shown in step 316. The IAM includes the PassiveLegTreatment parameter provided by the SCP 50. The PassiveLegTreatment parameter is included in a Service Access Parameter (SAP) in the IAM. The SSP 20 then sends the IAM to the SSP serving the called directory number, as shown in step 318. Upon receipt of the IAM, the SSP serving the called directory number applies the distinctive ring signal to the telephone line associated with the directory number, as shown in step 312. Thus, in accordance with the exemplary process of FIG. 3, a caller can control the ring signal applied to any telephone line of any SSP in the AIN network. Furthermore, the distinctive ring signal is applied to the called telephone line independent of distinctive ring services provided to the called telephone line.

FIG. 4 provides a flow diagram 400 illustrating another exemplary process for a caller to control a distinctive ring signal, subject to an authorization code. In step 402, the caller subscribes to a distinctive ring control service offered by a telecommunications carrier. When the caller subscribes to the service, an authorization code is established. The authorization code is either generated automatically by the telecommunications provider, or is input by the caller. The caller uses the authorization code to authorize use of the distinctive ring control service.

In step 404, the caller enters the distinctive ring control feature code and dials a directory number. In step 406, the system 10 prompts the caller to enter the authorization code established in step 402. In step 408, the system 10 determines if the caller has input a valid authorization code. If the authorization code is not valid, the system 10 applies a normal ring pattern signal to the telephone line associated with directory number, as shown in step 410. If, on the other hand, the authorization code is valid, the system 10 applies a distinctive ring pattern signal to the telephone line associated with the directory number, as shown in step 412. Thus, in accordance with the exemplary process of FIG. 4, a caller can control the ring pattern applied to any telephone line of any SSP in the AIN network from any telephone line of any SSP in the network, subject to a caller's authorization code.

The exemplary process of FIG. 4 facilitates charging a fee to the caller for the distinctive ring control service. The distinctive ring control service can be offered to a telecommunication service customer based on a periodic fee, such as monthly, quarterly, etc., or can be based on a per-use fee, in which the subscriber is charged a set fee for each use of the service. Furthermore, by providing the caller a unique authorization code, the caller can be charged a per-use fee each time the distinctive ring control feature is used by the caller, independent of the directory number from which the caller is placing the call. For example, the caller can place a call from a public payphone and access the distinctive ring control feature. By inputting a unique authorization code, the telephone service provider can charge the caller's account the per-use fee when the caller uses the distinctive ring control service.

Figure 5:
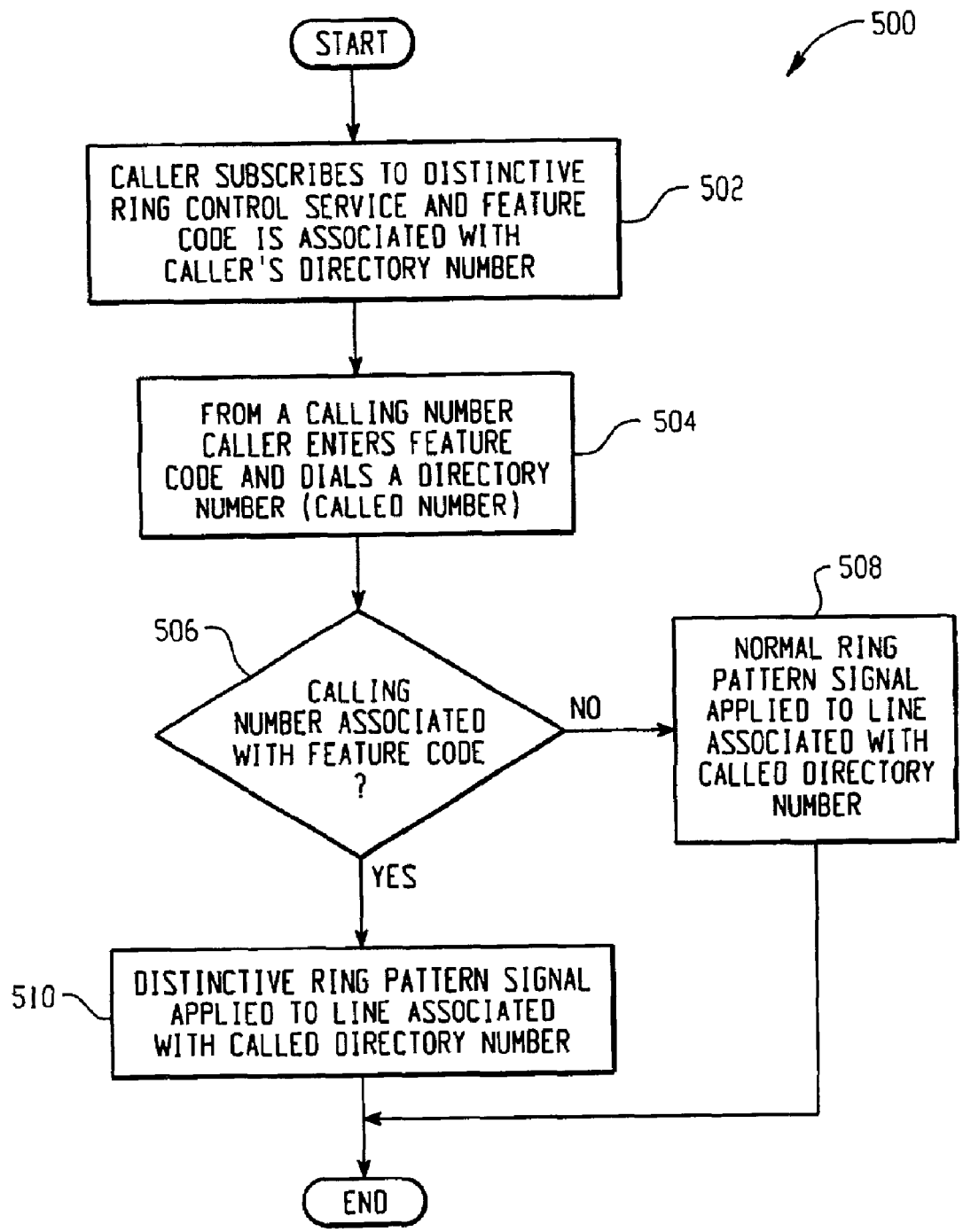
FIG. 5 is a flow diagram illustrating another exemplary process for a caller to control a ring pattern signal, subject to a directory number associated with a feature code.

Access to the distinctive ring control can also be limited to a directory number associated with the caller, e.g., the caller's home telephone number or business telephone number. FIG. 5 provides a flow diagram 500 describing another exemplary process for a caller to control a distinctive ring, subject to a directory number associated with the caller. In step 502, the caller subscribes to a distinctive ring control service offered by a telecommunications carrier. When the caller subscribes to the service, the feature code used to invoke the service is associated with the caller's directory number. Associating the caller's directory number with the feature code prevents the caller from controlling a distinctive ring when the calling number is not the caller's directory number.

In step 504, the caller enters a feature code and dials a directory number from a calling number. The directory number from which the caller is placing the call is the calling number. In step 506, the system 10 determines if the feature code entered by the caller is associated with the calling number from which the caller is placing the call. If the calling number is associated with the feature code, then the system 10 applies the distinctive ring pattern signal to the telephone line associated with the called directory number, as shown in step 508. However, if the calling number is not associated with the feature code, then the system 10 applies the normal ring pattern signal to the line associated with the called directory number, as shown in step 510. Thus, according to the exemplary embodiment of FIG. 5, a caller subscribing to a distinctive ring control service can access the service only from a directory number associated with the caller.

Figure 6:
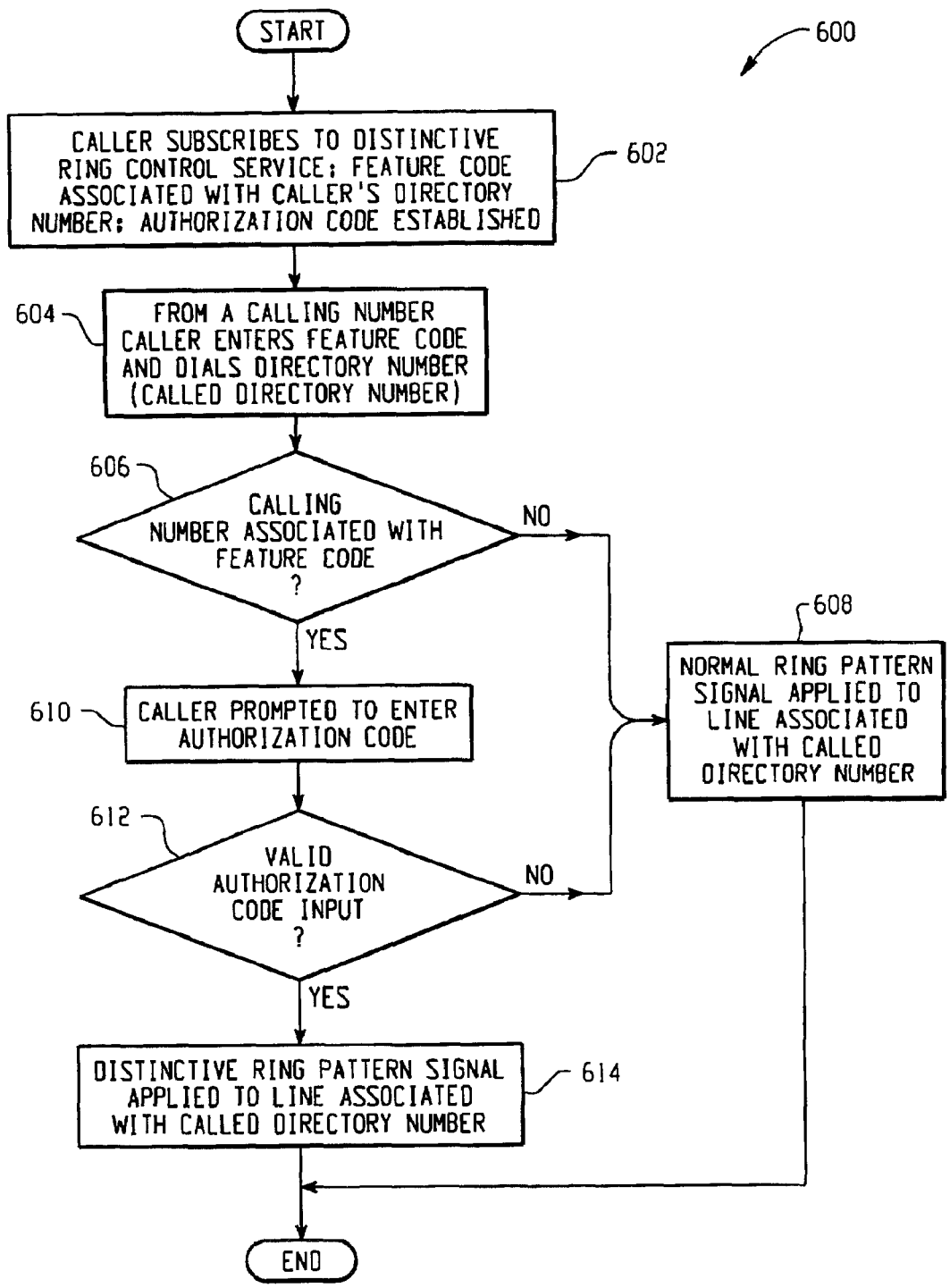
FIG. 6 is a flow diagram illustrating another exemplary process for a caller to control a ring pattern signal, subject to a directory number associated with the caller and an authorization code.

In addition limiting access to the distinctive ring control to a directory number associated with the caller, access can also be further limited by establishing an authorization code. FIG. 6 provides a flow diagram 600 illustrating another exemplary process for a caller to control a distinctive ring, subject to a directory number associated with the caller and an authorization code.

In step 602, the caller subscribes to a distinctive ring control service offered by a telecommunications carrier. When the caller subscribes to the service, the feature code used to invoke the service is associated with the caller's directory number, and an authorization code is established. Associating the caller's number to the feature code prevents the caller from controlling a distinctive ring when the calling number is not the caller's directory number.

The authorization code is either generated automatically by the telecommunications provider, or is input by the caller. The caller uses the authorization code to authorize use of the distinctive ring control service.

In step 604, the caller enters a feature code and dials a directory number. In step 606, the system 10 determines if the feature code entered by the caller is associated with the calling number from which the caller is placing the call. If the calling number is not associated with the feature code, the system 10 applies the normal ring pattern signal to the line associated with the called directory number, as shown in step 608. However, if the calling number is associated with the feature code, then the system 10 prompts the caller to enter an authorization code, as shown in step 610.

In step 612, the system 10 determines if the caller has input a valid authorization code. If the authorization code is not valid, the system 10 applies a normal ring pattern signal associated with the directory number, as shown in step 608. If, on the other hand, the authorization code is valid, the system 10 applies a distinctive ring pattern signal to the telephone line associated with the directory number, as shown in step 614. Thus, according to the disclosure of FIG. 6, a caller subscribing to a distinctive ring control service can access the service only from a directory number associated with the caller, and only upon entering a valid authorization code.

The system and method and the exemplary modes of operation have been illustrated with a telecommunications customer subscribing to the service. Of course, the service may also be provided free of charge by the telephone service provider. Furthermore, while access to the distinctive ring control has been illustrated by use of a feature code, other methods of accessing the distinctive ring control feature are also contemplated, such as dialing an access directory number. Illustratively, the access directory number is a toll free number. The SN 70 connects the call of the toll free number, and prompts the caller to enter a directory number to place a call. A call is then placed to the directory number entered by the caller, and a distinctive ring signal is applied to the telephone line associated with the directory number.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention received in the claims. The intended scope of the invention thus includes other structures, systems or methods that do not differ from the literal language of the claims, and further includes other structures, systems or methods with insubstantial differences from the literal language of the claims.

What is claimed is:

1. A telephone network, comprising:

a first service switching point being operable to receive a feature code and a called directory number input by a calling party placing a call, and to issue a query in response to receiving the feature code; and a service control point in communication with the first service switching point over a first communication path, the service control point being operable to receive the query and issue a response to the first service switching point, the response including a distinctive ring parameter;

wherein upon receiving the response from the service control point the first service switching point processes the call so that the distinctive ring parameter causes a distinctive ring signal to be applied to a called telephone line associated with the called directory number;

wherein the first service switching point further operable to receive an authorization code, and include the authorization code in the query; and the service control point is further operable to determine whether the authorization code is valid or invalid, and provides the distinctive ring parameter only upon determining that the authorization code is valid;

wherein the authorization code is a unique code associated with the calling party, and is generated automatically or determined by the calling party upon subscribing to a distinctive ring control service.

2. The telephone network of claim 1, wherein the calling party is charged a fee upon the service control point determining the authorization code is valid.

3. The telephone network of claim 1, wherein the calling party is charged a fee upon the call being answered.

4. The telephone network of claim 1, wherein the first service switching point is further operable to issue the query independent of a calling telephone line from which the feature code is received.

5. The telephone network of claim 4, wherein the distinctive ring parameter causes the distinctive ring signal to be applied to the called telephone line independent of services associated with the called telephone line.

6. The telephone network of claim 1, wherein the distinctive ring parameter causes the distinctive ring signal to be applied to the called telephone line independent of services associated with the called telephone line.

7. The telephone network of claim 6, wherein the first service switching point is further operable to issue the query independent of a calling telephone line from which the feature code is received.

8. The telephone network of claim 6, further comprising a second service switching point, the second service switching point serving the called directory number and in communication with the first service switching point over a second communication path, and wherein the first service switching point provides the second service switching point the distinctive ring parameter received from the service control point.

9. A method of processing a call placed by a calling party to a called telephone line in a telephone network, the telephone network comprising a first service switching point, a second service switching point and a service control point, the service control point in communication with the first and second service switching points over first and second communication paths, respectively, the method comprising the steps of:

receiving at the first service switching point an authorization code;

including the authorization code in the query, wherein the authorization code is a unique code associated with the calling party, and is generated automatically or determined by the calling party upon subscribing to a distinctive ring control service;

determining at the service control point whether the authorization code is valid or invalid; and providing the distinctive ring parameter if the authorization code is valid.

10. The method of claim 9, further comprising the steps of charging the calling party a fee if the authorization code is valid.

11. The meted of claim 9, wherein the step of sending the query from the first service switching point to the service control point after receiving the feature code is independent of a calling telephone line from which the feature code is received.

12. The method of claim 11, wherein the step of applying the distinctive ring signal to the called telephone line is independent of services associated with the called telephone line.

13. The method of claim 9, wherein the step of applying the distinctive ring signal to the called telephone line is independent of services associated with the called telephone line.

14. The telephone network of claim 9, further comprising the step of sending from the first service switching point to the second service switching point the distinctive ring parameter received from the service control point if the second service switching point serves the called telephone line.

15. A system for caller control of a distinctive ring, the system comprising:

a first service switching point serving a calling telephone line and being operable to receive from the calling telephone line a feature code and a called directory number associated with a called telephone line, and to issue a query in response to receiving the feature code; and a service control point in communication with the first service switching point over a first communication path, the service control point being operable to receive the query and issue a response to the first service switching point, the response including a distinctive ring parameter;

wherein upon receiving the response from the service control point the first service switching point processes the call so that upon connection of the call distinctive ring parameter causes a distinctive ring signal to be applied to the called telephone line independent of services associated with the called telephone line;

wherein the first service switching point is further operable to issue the query independent of the calling telephone line;

wherein the first service switching point is further operable to receive an authorization code and include the authorization code in the query; and the service control point is further operable to determine whether the authorization code is valid or invalid, and provides the distinctive ring parameter only upon determining that the authorization code is valid;

wherein the authorization code is a unique code associated with the calling party.

16. The system of claim 15, wherein the calling party is charged a fee upon the service control point determining the authorization code is valid.

17. The method of claim 15, wherein if the service control point determines the authorization code is invalid the first service switching point processes the call so that upon connection of the call a normal ring signal is applied to the called telephone line.

* * * * *